United States Patent
Bertelsmeier et al.

(10) Patent No.: US 7,707,565 B2
(45) Date of Patent: Apr. 27, 2010

(54) METHOD FOR CONSISTENT AND EFFICIENT MANAGEMENT OF PROGRAM CONFIGURATION AND CUSTOMIZING DATA

(75) Inventors: Frank Bertelsmeier, Speyer (DE); Andreas Simon Schmitt, Kaiserslautern (DE); Helmut Prestel, Bad Schoenborn (DE)

(73) Assignee: SAP Aktiengesellschaft, Walldorf (DE)

( * ) Notice: Subject to any disclaimer, the term of this patent is extended or adjusted under 35 U.S.C. 154(b) by 1306 days.

(21) Appl. No.: 11/173,563

(22) Filed: Jul. 1, 2005

(65) Prior Publication Data

US 2007/0005745 A1    Jan. 4, 2007

(51) Int. Cl.
*G06F 9/45* (2006.01)
(52) U.S. Cl. .................... 717/145; 717/143; 717/148; 717/162
(58) Field of Classification Search .............. None
See application file for complete search history.

(56) References Cited

U.S. PATENT DOCUMENTS

2006/0026583 A1* 2/2006 Remmel et al. ............. 717/162

* cited by examiner

*Primary Examiner*—Chuck O Kendall
(74) *Attorney, Agent, or Firm*—Fish & Richardson P.C.

(57) ABSTRACT

A computer system and computer program product executing a method for consistent and efficient management of program configuration and customizing data for a business application program. According to one method, an existing or newly created version of a global switch configuration is provided in a cache shared by one or more other programs. The cached switch configuration provides a configuration for a switch framework that governs access to one or more program functions of a business application. The cached switch configuration is then attached to the business application to provide an attached version of the switch configuration. Compatibility between the attached version of the switch configuration and the business application is determined. If compatibility exists, the business application program is executed in accordance with the attached version of the switch configuration.

20 Claims, 2 Drawing Sheets

METHOD FOR CONSISTENT AND EFFICIENT MANAGEMENT OF PROGRAM CONFIGURATION AND CUSTOMIZING DATA

BACKGROUND

This document relates configuration and customizing data for executing multiple, independent instances of business application programs.

In a simplified model of executing a computer program such as a business application, there are three categories of information needed: the program code to be executed (operations); the application data to be processed (input and output data); and often additional configuration data (customizing data). Configuration data configure the application by fixing pre-defined properties of the program, such as the set of available functions, the way implemented functions behave, the user interface, or general user-specific settings (such as number and date/time format etc.). Configuration data make an application more flexible by changing certain properties or parameters of the application without modifying and recompiling the application.

In terms of abstraction configuration data lie somewhere between program code and application data. Configuration data can thus be classified and viewed as being more related to program operations (e.g., meta data that describes certain functional aspects of an application) or more related to application data (e.g., master data like units, ISO codes, or exchanges rates). Hence configuration data can be handled and processed in different ways: they can be evaluated during program compilation to optimize the coding according to the specific configuration settings, or they can be evaluated at program runtime in order to be used dynamically or to determine the program flow. Sometimes both approaches are used simultaneously to complement each other, exemplified by the kind of configuration data described in this document.

Business application programs are typically written and compiled according to a business application programming language such as the Advanced Business Application Programming (ABAP) language developed by SAP AG (Walldorf, Germany). The programming language ABAP features some mechanisms to support modification of the standard business coding necessary to integrate industry-specific or customer-specific requirements. This framework—known as the Enhancement and Switch Framework—has been used to retrofit industry-specific modifications back into the ERP standard coding, and to activate or deactivate those modifications dynamically to achieve industry-specific behavior of the business applications.

Within the ABAP switch framework, the ABAP modification code snippets—called "enhancements"—can be added to existing ABAP code at certain positions in the coding. Additionally, these enhancements can be switched on or off by setting separately stored switches. Depending on the switch setting, the corresponding enhancements are pre-processed by the ABAP compiler at compile-time and evaluated at run-time to decide whether or not the enhancement is to be executed. Accordingly, the switch settings serve to configure an application program dynamically. Generally speaking the switch values are configuration data for the business applications.

Those switch settings need to be adequately managed. The most significant requirements for the management of those switch settings include consistency and robustness of program execution, i.e. changes of switch settings must not influence running transactions, and all implicit and explicit accesses at runtime must deliver identical results. On the other hand time and space efficiency is very important. In particular, the time overhead for switch state queries must be as little as possible and should not have measurable effects on the performance of the business transaction. For reason of optimization, the switch settings can be evaluated statically at compile-time in order to adapt or prepare the target program code according to the switch settings.

This approach to managing any kind of configuration data originated within the switch framework which manages those switch settings as a special kind of configuration data. Within a typical software product portfolio, a large amount of configuration data for business applications—called "customizing data"—are used. Those customizing data can have very different characteristics and thus be processed in different ways, as discussed above. But for most kinds of configuration data this method can be applied.

Currently, customizing data are often simply read directly from a database at runtime of the application. There is no versioning, and the applications are not prevented from accessing modified customizing data which may lead to inconsistencies and adverse effects. Accordingly, robustness and consistency of business applications are suffering from modifying customizing data at runtime. Additionally, database access operations significantly decrease time efficiency. On the other hand if the configuration data is stored into the current program context identical configuration data is redundantly stored in every program instance because there is no sharing.

SUMMARY

This document describes a product and method for handling switch settings in a switch framework of a business application program to make program enhancements dynamically switchable. This product and method can also be used to manage other kinds of program configuration data which are evaluated dynamically by the running program, to provide consistent and robust use of program configuration data (at compile-time and during the complete runtime). This product and method can also provide time and space efficiency due to interweaving of compiler preprocessing and runtime optimizations.

This concept can be used for all kinds of program configuration and customizing data. The switch settings are a special category of those program configuration data. They hold information, mostly external, about which parts of an ABAP program should be executed or not. This concept to manage and store configuration and customizing data can be used as a general infrastructure for the customizing data in the complete SAP application development. It also supports the bundling of related configuration data.

This document introduces a generalized concept for an efficient, consistent and robust management of those customizing and configuration data. In some embodiments, a method uses the management of switch settings within the switch framework as an example of configuration data that configure the business applications dynamically in order to explain and present the characteristics of the method.

This document discloses a method for consistent and efficient management of program configuration and customizing data for a business application program. According to one method, preferably executed as a computer system and/or computer program product, According to one method, an existing or newly created version of a global switch configuration is provided in a cache shared by one or more other programs. The cached switch configuration provides a configuration for a switch framework that governs access to one or more program functions of a business application. The cached switch configuration is then attached to the business application to provide an attached version of the switch configuration. Compatibility between the attached version of the switch configuration and the business application is determined. If compatibility exists, the business application program is executed in accordance with the attached version of the switch configuration. This version will not be modified and is tightly coupled with the running business application. Every access to the switch configuration uses this same source and always delivers consistent results.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
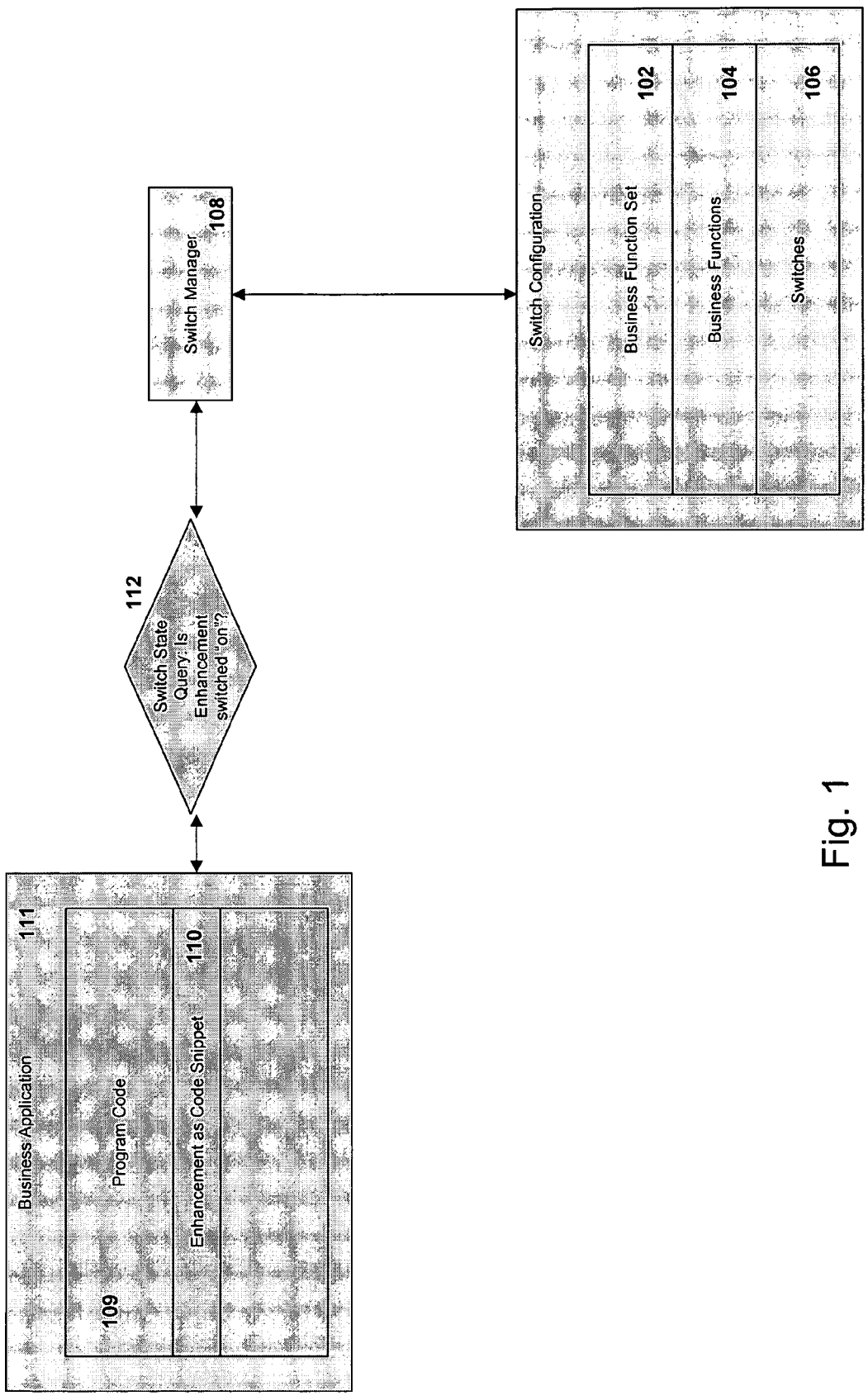
FIG. 1 is a block diagram of the enhancement and switch framework and switch manager.

FIG. 1 illustrates a switch framework 100 on which a method to manage switch settings can be performed. Switches 106 are part of a hierarchy formed of business function sets 102 built upon business functions 104, which are in turn built upon the switches 106. The switch settings are derived from the settings of the business functions 104 and the business function sets 106. These settings form a bundle of related configuration settings. Accordingly, all switch settings are interdependent, and hence together form a single switch configuration of the switch framework 100. The switch framework 100 is managed by a switch manager 108. When executing the program code 109 of a business application 111, for each enhancement 110 a program flow determines the associated switch and requests the switch state 112 using the switch manager 108 and, depending on the result, the coding within the enhancement 110 is executed or not executed.

Figure 2:
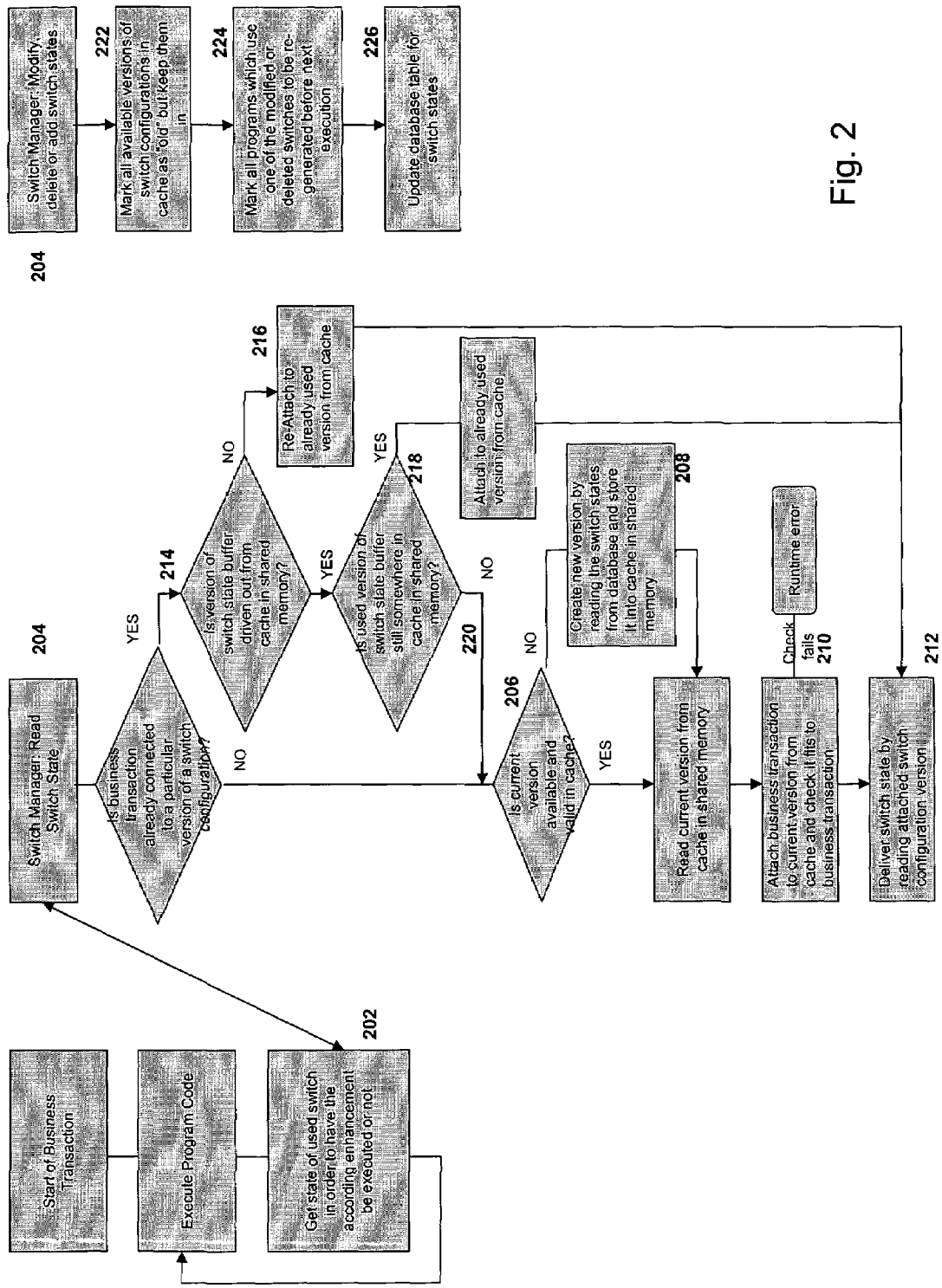
FIG. 2 is a flowchart illustrating actions taken in a switch configuration of a business application program.

FIG. 2 illustrates a method 200 of managing a switch configuration of a business application program. During runtime of a business transaction the state of a certain switch (that is used and connected to the enhancement) must be determined in order to decide whether an enhancement is to be executed or not (202). This request is directed at the switch manager (204) which is responsible for switch configuration management. If the current program context is still not linked to a specific version of a switch configuration, the current version of the switch configuration is searched for (206). If the search fails, i.e. there is no valid switch configuration version in the cache, a new version is created by reading the switch states from a database table (208).

In either case, the configuration version is checked for compatibility to the compiled program and then tightly linked to the program context (210). All further switch queries use the attached and fixed switch configuration version during the complete runtime of the transaction (212). Accordingly, a switch configuration is "frozen" along with the first access of a program instance to it. Thus, each transaction or functions thereof executed under the fixed version of the switch configuration behave in the same manner even if the global switch configuration changes in between transactions or functions.

All versions of the switch configuration are stored in a central cache in shared memory (208) in order to share the same version between arbitrary programs and work processes. This way many programs share the same switch configuration and there is very little memory overhead consumed. In cases where switch settings are not modified, there is only one switch configuration stored in shared memory, and different versions do not exist.

If the program context is already linked to a certain version of a switch configuration, it must be checked if the version in the cache is not driven out or replaced (214). If the linked version is valid, it can be used (216). Alternatively, the version could have been moved to another area in the cache and it can be searched for and accessed there (218). If this all fails the switch manager tries to create a new version of the switch configuration, but determines whether the newly created version is identical to the version that is already used by the program context (220).

If one or more switch settings are modified, deleted or added, all available versions of the switch configuration are marked as "old" but still made available for all currently running programs (222). Programs that are started after modifications are made to the current version use a new switch configuration in accordance with the modifications. Since the switch configuration is also evaluated at compile-time by the compiler in order to enrich and to optimize the compilation result, all programs that use certain switches must be marked as "to-be-recompiled" (224). Additionally the new switch configuration is stored in a database table (226). The next business transaction that reads switch states then triggers the recreation of a new version of the switch configuration in the cache (204, 206, 208, 210). Accordingly, the handling of switch management is always triggered on-demand at the first access to a switch.

Access to switch settings is handled by the same application program interface (API) of the switch management component independent of whether these are at compile-time or at run-time in order to ensure a consistent view on the switch settings at any time (204). Thus static and dynamic accesses to switch values are consistent in that the switches deliver identical results. Additionally, a change of switch settings that are evaluated and used at compile-time for a certain program results in the invalidation of that program and hence force a re-compilation (224). Thus, at program start, the current switch configuration that matches the switch configuration at compile-time is always used, and the switch configuration used at compile-time and at runtime always fits together.

At compile-time the ABAP compiler pre-processes all static/implicit switches and collects and stores those switches in the compilation result. At the beginning of program execution those switches are enriched by the current switch settings taken from the current valid switch configuration. Access to the switch settings are optimized in this way, and index operations make such access efficient since the switch configuration is fixed during the program execution. This optimization—the direct access via index operation—is facilitated by the fact that a used version of the switch configuration is stable and tightly linked to the program during the complete runtime.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

The invention claimed is:

1. A method, comprising:
    caching an existing or newly created version of a global switch configuration in a machine-readable storage device of a computer shared by one or more other programs executed by the computer, the cached switch configuration providing a configuration for a switch framework that governs access to one or more program functions of a business application;
    attaching the cached switch configuration to the business application to provide an attached version of the switch configuration;
    determining compatibility between the attached version of the switch configuration and the business application;
    if compatibility exists, compiling the business application program in accordance with the attached version of the switch configuration to provide a compilation result having switch settings stored therein;
    generating a current valid version of a switch configuration; and
    executing the compiled business application program, wherein the switch settings stored in the compilation result are enriched by current switch settings taken from the current valid switch configuration.

2. A method in accordance with claim 1, further comprising linking the executed business application program with the attached version of the switch configuration to inhibit modification of the attached version of the switch configuration.

3. A method in accordance with claim 1, further comprising designating all attached versions of the switch configuration as old versions after modifications are committed to the global switch configuration.

4. A method in accordance with claim 1, further comprising:
    adding modifications to the global switch configuration;
    generating a new version of a switch configuration based on modifications made to the global switch configuration;
    using the attached version of the switch configuration for the currently-running business applications after generating the new version;
    using the new version of the switch configuration for later-started business applications.

5. A method in accordance with claim 4, further comprising:
    storing the new switch configurations in a database table; and
    moving the new switch configurations from the database table to the cache in response to the start of a new business application that uses the new switch configuration.

6. A method in accordance with claim 1, further comprising:
    designating programs that use modified switches; and
    re-compiling programs that use modified switches.

7. A method in accordance with claim 1, further comprising:
    designating the program as invalid;
    re-compiling the program; and
    changing a switch setting that is evaluated at compile-time for the program.

8. A machine-readable storage device having a computer program product stored thereon, the computer program product comprising instructions operable to:
    provide an existing or newly created version of a global switch configuration in a cache shared by one or more other programs, the cached switch configuration providing a configuration for a switch framework that governs access to one or more program functions of a business application;
    attach the cached switch configuration to the business application to provide an attached version of the switch configuration;
    determine compatibility between the attached version of the switch configuration and the business application;
    if compatibility exists, compile the business application program in accordance with the attached version of the switch configuration to provide a compilation result having switch settings stored therein;
    generate a current valid version of a switch configuration; and
    execute the compiled business application program, wherein the switch settings stored in the compilation result are enriched by current switch setting taken from the current valid switch configuration.

9. A storage device in accordance with claim 8, further comprising instructions operable to:
  link the executed business application program with the attached version of the switch configuration to inhibit modification of the attached version of the switch configuration.

10. A storage device in accordance with claim 8, further comprising instructions operable to designate all attached versions of the switch configuration as old versions after modifications are committed to the global switch configuration.

11. A storage device in accordance with claim 8, wherein the executable software module further includes instructions operable to:
  add modifications to the global switch configuration;
  generate a new version of a switch configuration based on modifications made to the global switch configuration;
  use the attached version of the switch configuration for the currently-running business applications after generating the new version;
  use the new version of the switch configuration for later-started business applications.

12. A storage device in accordance with claim 11, wherein the executable software module further includes instructions operable to:
  store the new switch configurations in a database table; and
  move the new switch configurations from the database table to the cache in response to the start of a new business application that uses the new switch configuration.

13. A storage device in accordance with claim 8, wherein the executable software module further includes instructions operable to:
  designate programs that use modified switches; and
  re-compile programs that use modified switches.

14. A storage device in accordance with claim 8, wherein the executable software module further includes instructions operable to:
  designate the program as invalid;
  re-compile the program;
  change a switch settings that is evaluated at compile-time for a program.

15. A computer system comprising:
  a machine-readable storage device having an executable software module stored thereon, the executable software module including instructions operable to:
    provide an existing or newly created version of a global switch configuration in a cache in a computer shared by one or more other programs executed by the computer, the cached switch configuration providing a configuration for a switch framework that governs access to one or more program functions of a business application;
    attach the cached switch configuration to the business application to provide an attached version of the switch configuration;
    determine compatibility between the attached version of the switch configuration and the business application;
    if compatibility exists, compile the business application program in accordance with the attached version of the switch configuration to provide a compilation result having switch settings stored therein;
    generate a current valid version of a switch configuration; and
    execute the compiled business application program, wherein the switch settings stored in the compilation result are enriched by current switch setting taken from the current valid switch configuration.

16. A system in accordance with claim 15, wherein the executable software module further includes instructions operable to:
  link the executed business application program with the attached version of the switch configuration to inhibit modification of the attached version of the switch configuration.

17. A system in accordance with claim 15, wherein the executable software module further includes instructions operable to designate all attached versions of the switch configuration as old versions after modifications are committed to the global switch configuration.

18. A system in accordance with claim 15, wherein the executable software module further includes instructions operable to:
  add modifications to the global switch configuration;
  generate a new version of a switch configuration based on modifications made to the global switch configuration;
  use the attached version of the switch configuration for the currently-running business applications after generating the new version;
  use the new version of the switch configuration for later-started business applications.

19. A system in accordance with claim 18, wherein the executable software module further includes instructions operable to:
  store the new switch configurations in a database table; and
  move the new switch configurations from the database table to the cache in response to the start of a new business application that uses the new switch configuration.

20. A system in accordance with claim 15, wherein the executable software module further includes instructions operable to:
  designate programs that use modified switches; and
  re-compile programs that use modified switches.

* * * * *